(12) United States Patent
Tabota

(10) Patent No.: US 6,672,160 B2
(45) Date of Patent: Jan. 6, 2004

(54) ACCELERATION SENSOR

(75) Inventor: Jun Tabota, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 09/957,105

(22) Filed: Sep. 20, 2001

(65) Prior Publication Data
US 2002/0047700 A1 Apr. 25, 2002

(30) Foreign Application Priority Data
Sep. 29, 2000 (JP) ........................................ 2000-298008

(51) Int. Cl.[7] ........................... G01P 15/10; G01P 15/09
(52) U.S. Cl. ................................. 73/514.29; 73/514.34
(58) Field of Search ....................... 73/504.12, 514.34, 73/514.29

(56) References Cited

U.S. PATENT DOCUMENTS

| | | | | |
|---|---|---|---|---|
| 4,346,597 A | * | 8/1982 | Cullen ........................... | 73/510 |
| 5,063,782 A | * | 11/1991 | Kellett ...................... | 73/514.34 |
| 5,490,422 A | * | 2/1996 | Tabota et al. ............. | 73/514.34 |
| 5,515,725 A | * | 5/1996 | Tabota et al. ............. | 73/514.34 |
| 6,043,588 A | * | 3/2000 | Tabota et al. ................ | 310/329 |

FOREIGN PATENT DOCUMENTS

| | | |
|---|---|---|
| JP | 4361165 | 12/1992 |
| JP | 6273439 | 9/1994 |

* cited by examiner

Primary Examiner—Hezron Williams
Assistant Examiner—John C Hanley
(74) Attorney, Agent, or Firm—Keakting & Bennett, LLP

(57) ABSTRACT

An acceleration sensor includes a bimorph type acceleration detection element including a first resonator and a second resonator, each resonator formed of a piezoelectric body and having electrodes arranged on both main surfaces thereof, and an intermediate layer. The acceleration detection element is produced by bonding the first resonator and the second resonator with the intermediate layer interposed therebetween. The acceleration detection element is supported at one longitudinal end or opposed longitudinal ends thereof so that the first and second resonators are integrally deflected under acceleration. The intermediate layer is hard enough to transfer flexural stress in one of the first and second resonator to the other of the first and second resonators and the vibration of the one of the first and second resonators is attenuated when the vibration is transmitted from the one to the other of the first and second resonators. Acceleration is detected by detecting a difference between frequency changes of the first resonator and the second resonator or a difference between impedance changes of the first resonator and the second resonator, which takes place under acceleration.

6 Claims, 6 Drawing Sheets

ACCELERATION SENSOR

BACKGROUND OF THE INVENTION

1. Field of the Invention

The present invention relates to an acceleration sensor.

2. Description of the Related Art

Japanese Patent No. 2780594 discloses an acceleration sensor employing a piezoelectric ceramic. This acceleration sensor includes a bimorph type detection element which is produced by laminating a pair piezoelectric devices formed of piezoelectric ceramics into a unitary body. The detection element is supported at both ends thereof and housed in a casing. When acceleration acts on the acceleration sensor, the detection element is deflected, and stress is generated in the defection element. The acceleration sensor detects acceleration, by detecting charge or voltage generated through piezoelectricity. The acceleration sensor is compact enough to be easily structured into a surface-mounting component (a chip component).

In the acceleration sensor working on this principle, a bias current flowing from a circuit of the sensor into the piezoelectric body is charged in a capacitor C of the piezoelectric body, and a resistor R is thus required to leak the bias current. The resistor R and the capacitor C form a filter, thereby leaving a direct current and a low frequency component below a cutoff frequency thereof undetected.

In a known acceleration sensor (disclosed in Japanese Unexamined Patent Application Publication No. 4-361165), two vibrators are mounted on a flex-type tuning fork support body. When acceleration acts on the vibrators, the vibrators mounted the tuning fork support structure are subject to tensile stress and compressive stress at central inertia portions (weight portions), and acceleration is detected from a frequency difference taking place between the two vibrators. This acceleration sensor detects a direct-current and low-frequency components.

Since the acceleration sensor thus constructed has the support body of tuning fork, the design of the structure becomes complex and bulky, and extensions of electrodes from the vibrators are also complex. It is therefore difficult to arrange this acceleration sensor in a miniature surface-mounting component (a chip component) which may directly be mounted on a printed circuit board.

The tuning fork vibrator is designed as a bimodal tuning fork vibrator to vibrate in a combination vibration mode in which a torsional vibration mode and a flexural vibration mode are combined, thereby reducing dependency of a bias frequency on temperature. This arrangement fails to fully eliminate the temperature dependency thereof.

SUMMARY OF THE INVENTION

Accordingly, it is an object of the present invention to provide a compact and high-gain acceleration sensor which is surface-mounted and insensitive to factors such as temperature changes other than acceleration.

The above object is achieved by the present invention as will be discussed below.

The present invention in one aspect includes a bimorph type acceleration detection element including a first resonator, a second resonator and an intermediate layer, in which the first resonator and the second resonator are bonded with the intermediate layer interposed therebetween. Each resonator includes a piezoelectric body and electrodes arranged on both main surfaces thereof. The intermediate layer is hard enough to transmit flexural stress in one of the first and second resonator to the other of the first and second resonators and the vibration of the one of the first and second resonators is attenuated to be transmitted to the other of the first and second resonators. The acceleration detection element is supported at one longitudinal end or both longitudinal ends thereof such that the first and second resonators are deflected in the same direction according to the application of acceleration. Acceleration is detected by detecting a difference between frequency changes of the first resonator and the second resonator or a difference between impedance changes of the first resonator and the second resonator which is caused by deflection of said acceleration detection element.

The acceleration sensor of the present invention has a bimorph structure in which the acceleration detection element is produced by bonding the two resonators together with the intermediate layer interposed therebetween. The intermediate layer has a hardness that allows flexural stress to be transmitted from one resonator to the other resonator. When acceleration is applied, the acceleration detection element deflects and is distorted, then tensile stress acts on the one resonator, and compressive stress acts the other resonator. The intermediate layer has the function of modestly mechanically coupling the two resonators in vibration transfer. In other words, the vibration of the one resonator are attenuated to be transferred to the other resonator. For this reason, each resonator vibrates at its own natural frequency. The frequency of the resonator on the tensile side of the element becomes lower, while the frequency of the resonator on the compressive side of the element becomes higher. Acceleration is thus detected by differentially picking up a difference between frequency changes of the two resonators or a difference between impedance changes of the two resonators.

Since the frequency difference or the impedance difference is detected, rather than individually picking up the frequency changes of the two resonators or the impedance changes of the two resonator, stresses commonly acting on the two resonators (a stress due to a temperature change, for example) cancel each other out. A high-gain acceleration sensor free from the effect of temperature changes is provided.

Preferably, the intermediate layer is constituted of an elastic adhesive layer. The intermediate layer transfer flexural stress and the vibration of the one resonator is attenuated to be transmitted to the other resonator. Using the elastic adhesive layer, these functions are easily performed.

An epoxy-based adhesive agent, an epoxy-acrylic adhesive agent, or silicone-based adhesive agent may be used for the elastic adhesive layer. When the epoxy-based adhesive agent or the epoxy-acrylic agent is used, the thickness thereof may be as thick as several $\mu$m to dozens of $\mu$m. When the silicone-based adhesive is used, the thickness thereof is as thick as several $\mu$m because of its small elastic coefficient.

Preferably, each of the first and second resonators is a vibration mode element in which energy is trapped to the longitudinal center portion thereof, and a gap is provided in the longitudinal center of the intermediate layer. The gap is larger in area than a trapped vibration region of each of the first and second resonators and smaller in area than a deflection region of each of the first and second resonators which deflect according to acceleration.

Laminating the resonator and the intermediate layer on the entire surfaces thereof is acceptable. However, it is noted that such an arrangement reduces performance of the resonator (such as Q and K factors) because the vibration of the resonator is restricted by the intermediate layer. Since the intermediate layer has, in the longitudinal center thereof, the gap which is larger in area than a trapped vibration region of each resonator and smaller in range than a deflection region of each resonator which deflects under acceleration, the transfer of the vibration is controlled even if the non-elastic material is used as the intermediate layer. Furthermore, the intermediate layer transfers flexural stress from one to the other resonator.

Preferably, the external surface of the acceleration detection element, facing in a direction in which acceleration is applied, is covered with a casing member, and each open surface which the acceleration detection element and the casing member define is covered with a covering member, and the electrodes arranged on the first and second resonators are respectively connected to external electrodes arranged on the surface of the covering member via internal electrodes arranged on the surface of the casing member.

The acceleration detection element is fully enclosed in the casing member and the covering member, and is thereby appropriate for use as a surface-mounting electronic component.

The acceleration sensor of the present invention uses two methods for differentially picking up the signals from the first resonator and the second resonator and for obtaining a signal proportional to acceleration acting on the acceleration detection element. In one method, the first and second resonators are oscillated at different frequencies, a difference between the oscillated frequencies is detected, and a signal proportional to acceleration is determined from the frequency difference. In the other method, the first and second resonators are oscillated at the same frequency, one of a phase difference and an amplitude difference is obtained from a difference between electric impedances of the two resonators, and a signal proportional to acceleration is determined from one of the phase difference and the amplitude difference.

Acceleration is detected with high accuracy using either of the above two methods.

DESCRIPTION OF THE PREFERRED EMBODIMENTS

Figure 1:
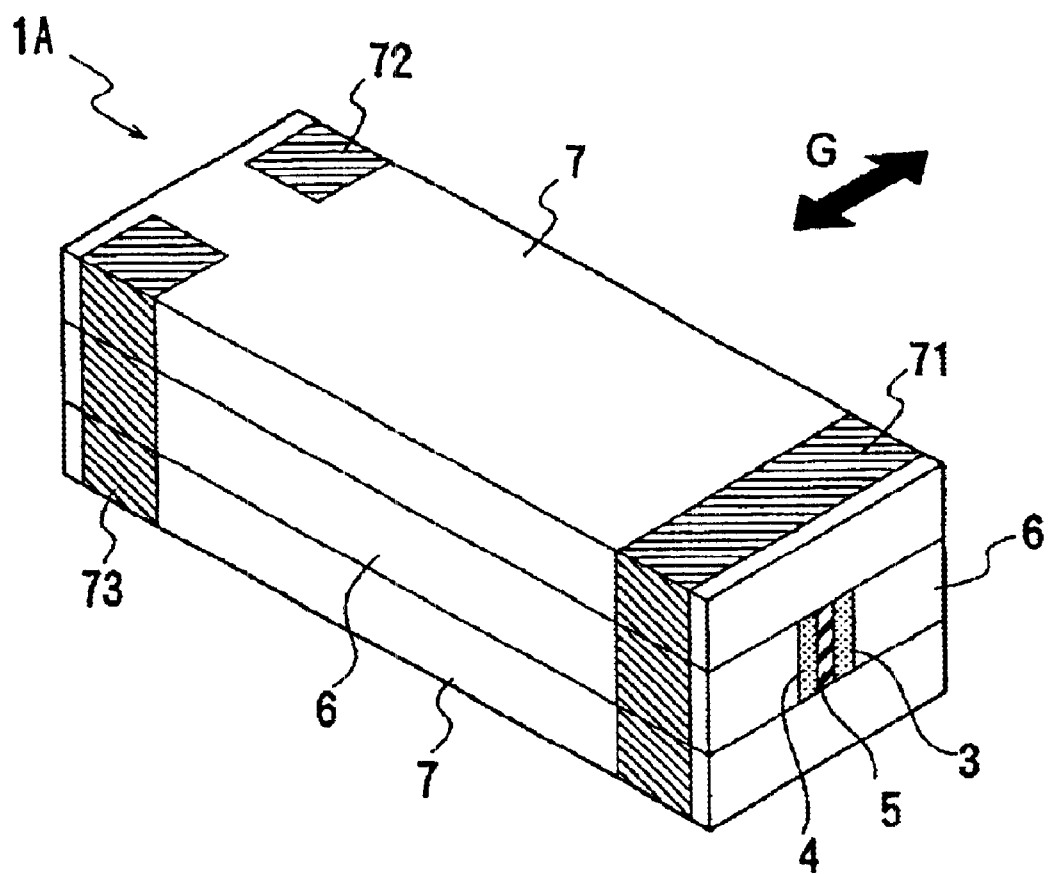
FIG. 1 is a general perspective view showing a first embodiment of an acceleration sensor of the present invention.

FIG. 1 through FIG. 5 show an acceleration sensor 1A of a first embodiment of the present invention. The acceleration sensor 1A includes a bimorph type acceleration detection element 2 which is supported at both ends thereof in insulating cases 6 and 7 fabricated of ceramic. The acceleration detection element 2 is produced by bonding striplike piezoelectric ceramic resonators 3 and 4 with an intermediate layer 5 interposed therebetween. The resonator 3 has electrodes 3a and 3b on both main surfaces thereof, and the resonator 4 has electrodes 4a and 4b on both main surfaces thereof. Each of the resonators 3 and 4 is an energy-trapping thickness shear vibration mode resonator, and is polarized in the longitudinal direction thereof. The electrodes 3a and 3b in the ends thereof face each other in the center portion of the resonator 3 and extend from there toward different opposed ends of the resonator 3. The electrodes 4a and 4b in the ends thereof face each other in the center portion of the resonator 4 and extend from there toward different opposed ends of the resonator 4.

The resonators 3 and 4 are laminated with the intermediate layer 5 of an elastic adhesive agent interposed therebetween. The intermediate layer 5 has a hardness which allows flexural stress to be transferred from one resonator to the other resonator, while attenuating the vibration of the one resonator when the vibration is transferred to the other resonator. Since the resonators 3 and 4 are fabricated of piezoelectric ceramic substrates having the same shape, a flexurally neutral plane of the acceleration detection element 2 in response to acceleration G lies within the intermediate layer 5 (as represented by dotted line N in FIG. 5).

The opposed external surfaces of the acceleration detection element 2, facing in a direction in which acceleration G is applied, are surrounded with a pair of casing members 6 and 6. Each casing member 6 has a flattened U-shaped cross section, with bath projecting segments 6a thereof securely banded to external opposed ends of the acceleration detection element 2 (external surfaces of the resonators 3 and 4). Recesses 6b thus form gaps respectively between the one casing member 6 and the acceleration detection element 2 and between the other casing member 6 and the acceleration detection element 2. The gaps thus allow the acceleration detection element 2 to deflect in response to the acceleration G. The top and bottom open surfaces of an assembly of the acceleration detection element 2, and the casing members 6 are then covered respectively with top and bottom covering members 7 and 7 from above and below. The covering members 7 respectively have, on the inner surfaces thereof, recess 7a forming a gap not to contact respectively the acceleration detection element 2. The peripheral outline portions of covering members 7 is securely bonded to the top and bottom surfaces of the assembly. Displaceable portions of the acceleration detection element 2 is fully enclosed in the casing members 6 and the covering member 7.

The casing members 6, and the covering member 7 are fabricated of insulating materials. Specifically, these components may be fabricated of a ceramic substrate or a resin substrate.

The casing members 6 having a U-shaped cross section are used in this embodiment. If a vibration space is assured by the thickness of each adhesive layer applied between the one casing member 6 and the acceleration detection element 2 and between the other casing member 6 and the acceleration detection element 2, the casing members 6 may be formed of a planar member. Since the deflection of each of the acceleration detection element 2 under the acceleration G is small in amplitude, the thickness of the adhesive layer provides a sufficiently large vibration space.

Similarly, since a gap is formed by the thickness of an adhesive layer applied in the inner surface of the covering member 7, the gap forming recess 7a in the inner surface of the covering member 7 is dispensed with.

The electrodes 3a and 4b, out of the electrodes 3a and 3b, and the electrodes 4a and 4b formed in the resonators 3 and 4, are electrically connected to each other through an internal electrode band 61 arranged on the open surface of the assembly composed of the acceleration detection element 2 and the casing members 6, and the internal electrode band 61 is routed out of the external surface of the casing member 6. The electrode 3b is routed out of the external surface of the casing member 6 through an internal electrode band 62 arranged on the top open surface of the assembly. The electrode 4a is routed out of another external surface of the casing member 6 through an internal electrode band 63 arranged on the bottom open surface of the assembly.

Referring to FIG. 1, the casing members 6 and the covering member 7 have, on the external surfaces thereof, external electrodes 71, 72, and 73. The internal electrode bands 61, 62, and 63 are respectively electrically connected to the external electrodes 71, 72, and 73. In this way, a surface-mounting chip type acceleration sensor is provided.

In this embodiment, the one electrode 3a of the acceleration detection element 3 is electrically connected to the one electrode 4b of the acceleration detection element 4 through the internal electrode band 61 as a common electrode. Alternatively, the four electrodes 3a, 3b, 4a, and 4b may be independently routed to respective external electrodes. In this case, the four internal electrode bands and the four external electrodes may be used.

Figure 4:
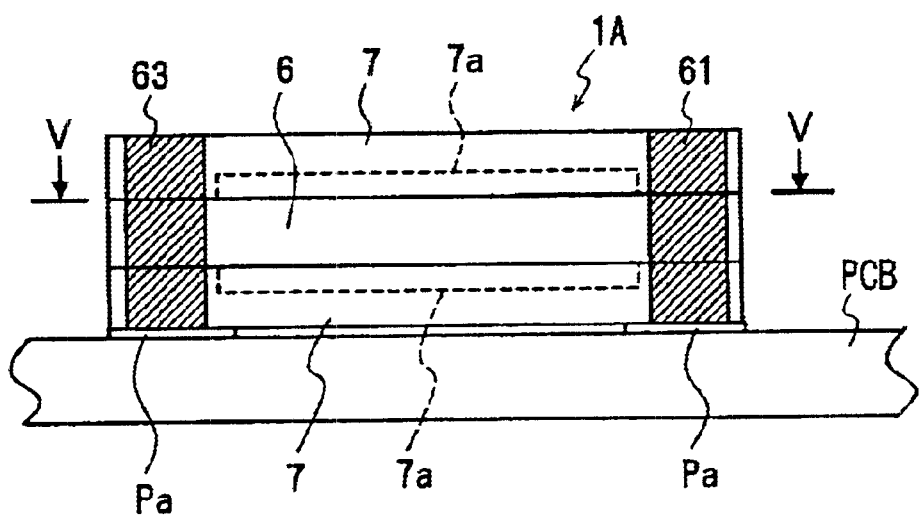
FIG. 4 is a side view showing the acceleration sensor shown in FIG. 1 mounted on a printed circuit board.

FIG. 4 shows the acceleration sensor 1A mounted on a circuit pattern Pa of a printed circuit board PCB.

FIG. 6 shows a manufacturing method for manufacturing the acceleration sensor 1A having the above-referenced construction.

Prepared are two piezoelectric ceramic sheets 3M and 4M respectively for the resonators 3 and 4, having electrode patterns for the electrodes 3a, 3b, and the electrodes 4a, and 4b respectively arranged on both main sides thereof, and a pair of casing member sheets 6M for the casing members 5, having recesses 6b each having a predetermined width at regular intervals. The sheets 3M, 4M, and 6M are bonded into a unitary structure using an adhesive agent. A block B1 is thus obtained by stacking a plurality of laminate structures (see FIG. 6A). The block B1 is diced along cut lines S as shown in FIG. 6A, and a plurality of individual blocks B2 are thus obtained (see FIG. 6B).

Figure 6C:
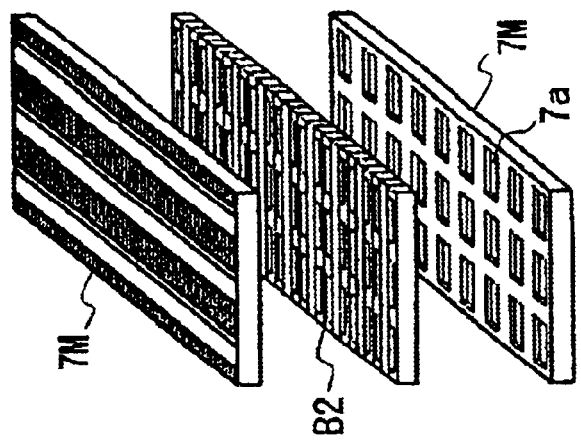
FIGS. 6A–6C are process diagrams showing the manufacturing method for manufacturing the acceleration sensor of FIG. 1.
Figure 6B:
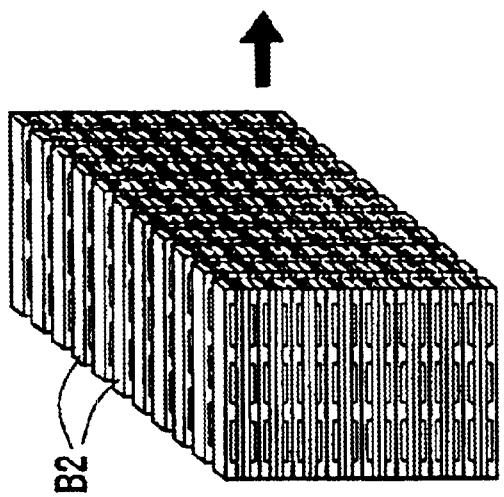
Figure 6A:
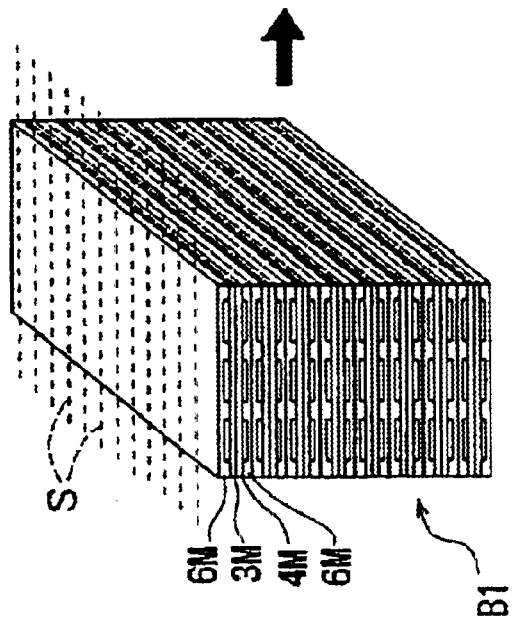

The cut individual blocks B2 are laid on their sides, and covering member sheets 7M having a number of gap forming recesses 7a on the internal surfaces thereof are bonded to each of the individual block B2 from above and below as shown in FIG. 6C. A final block is thus obtained. The covering member sheet 7M has patterns serving as external electrodes. The final block is vertically and horizontally cut into individual sensor devices. Electrodes are arranged on the sides and ends of each cut individual sensor device using a sputtering technique. The acceleration sensor 1A shown in FIG. 1 thus results.

Since the sheets for each member are prepared, and then laminated and bonded together in the state of sheet rather than individual strips in this way, production yield is high, and a uniform-quality and low-cost acceleration sensor 1A is thus provided.

Figure 7:
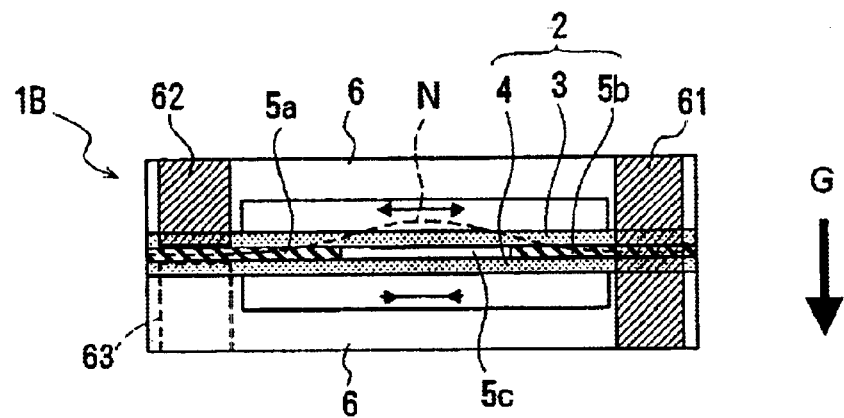
FIG. 7 is similar to the cross-sectional view of FIG. 5 taken along line V—V in FIG. 4, but showing a second embodiment of the acceleration sensor of the present invention.

FIG. 7 shows an acceleration sensor 1B of a second embodiment of the present invention.

The acceleration sensor 1B includes two intermediate layers 5a and 5b with a gap 5c formed therebetween. The gap 5c is wider in area than a region of trapped vibration of each of the resonators 3 and 4, and smaller in range than a deflection region of each of the resonators 3 and 4 under acceleration.

In the first embodiment, the resonators 3 and 4 are laminated together on the entire surfaces thereof, and vibrations of the resonators 3 and 4 are subject to damping. Performance of the resonators (such as Q and K factors) is possibly slightly degraded. The material of the intermediate layer 5 needs to be selected from particular materials having a proper hardness and a proper elasticity.

In the second embodiment, the vibration space 5c is formed between the two intermediate layers 5a and 5b. The transfer of vibration between the resonators 3 and 4 is thus controlled even if an adhesive agent having a high bond strength (such as an epoxy-based adhesive agent) is used as the intermediate layer 5. Since the resonators 3 and 4 use an energy-trapping thickness shear vibration mode, a small vibration space 5c works. The two resonators 3 and 4 are integrally flexed under acceleration G. Specifically, tensile stress is generated in one resonator, while compressive stress is generated in the other resonator.

Figure 2:
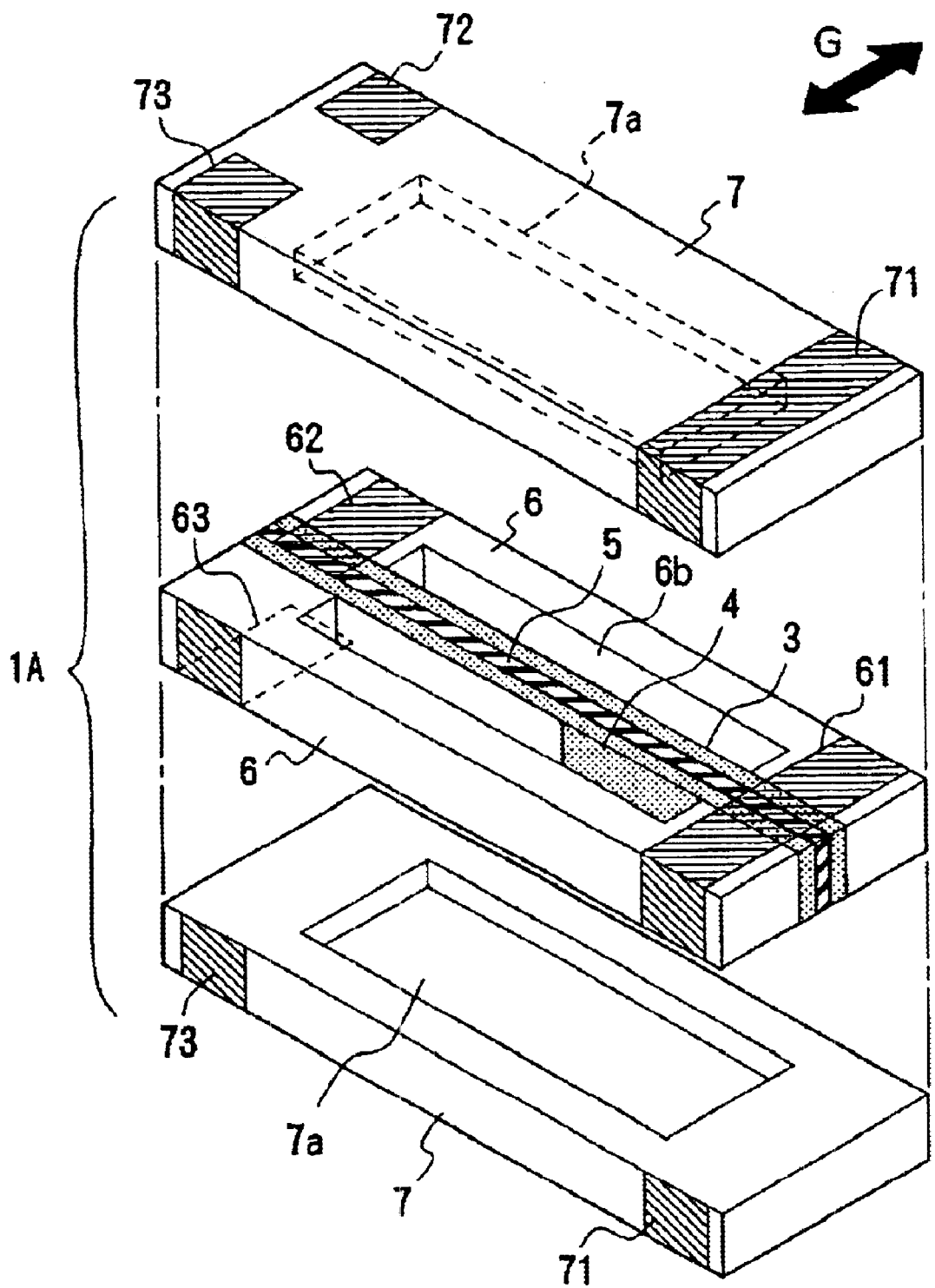
FIG. 2 is an exploded perspective view showing the acceleration sensor of FIG. 1.
Figure 3:
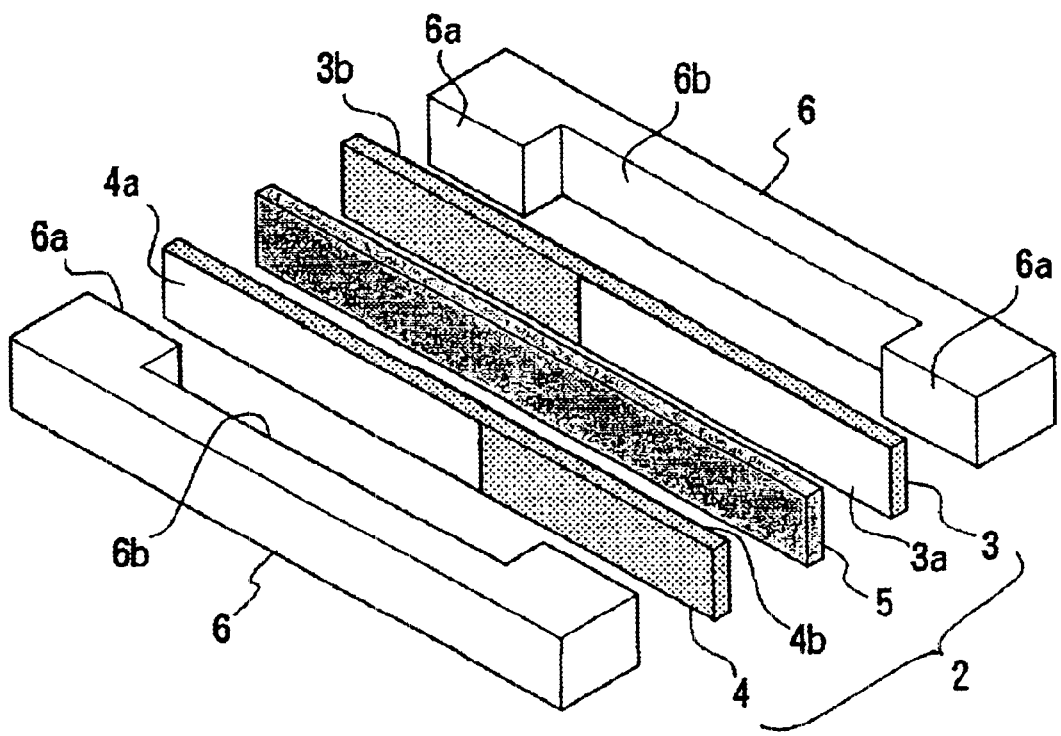
FIG. 3 is an exploded perspective view showing the acceleration sensor of FIG. 1 with a covering member removed.

The covering members 7 (not shown) are bonded to open surfaces of the resonators 3 and 4, and the casing members 6 as shown in FIG. 2.

Figure 8:
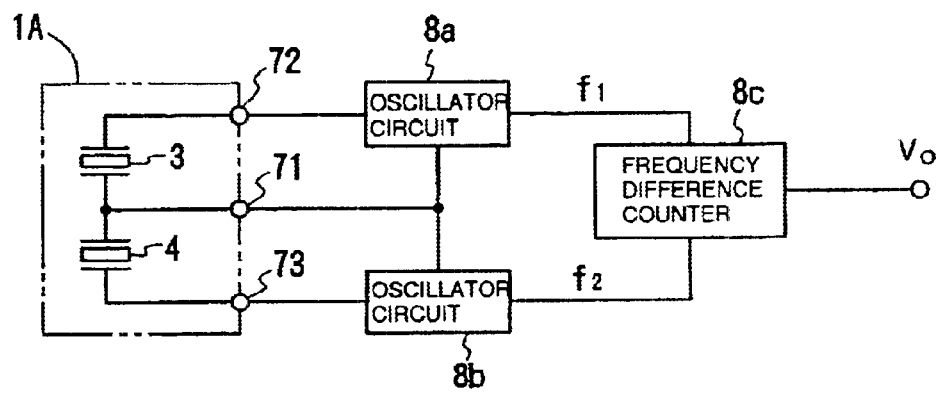
FIG. 8 is a circuit diagram showing an acceleration detection device using the acceleration sensor of the present invention.

FIG. 8 shows an acceleration detection device employing the acceleration sensor 1A. The device uses independent vibrations of the acceleration detection elements 3 and 4. The external electrodes 71 and 72 of the acceleration sensor 1A are connected to an oscillator circuit 8a, and the external electrodes 71 and 73 are connected to an oscillator circuit 8b. The oscillator circuits 8a and 8b may be a known Colpitt's oscillator. The resonators 3 and 4 are independently oscillated by the oscillator circuits 8a and 8b, and oscillated frequencies $f_1$ and $f_2$ are input to a frequency differential counter 8c. The frequency differential counter 8c outputs a signal $V_O$ proportional to the frequency difference.

Figure 5:
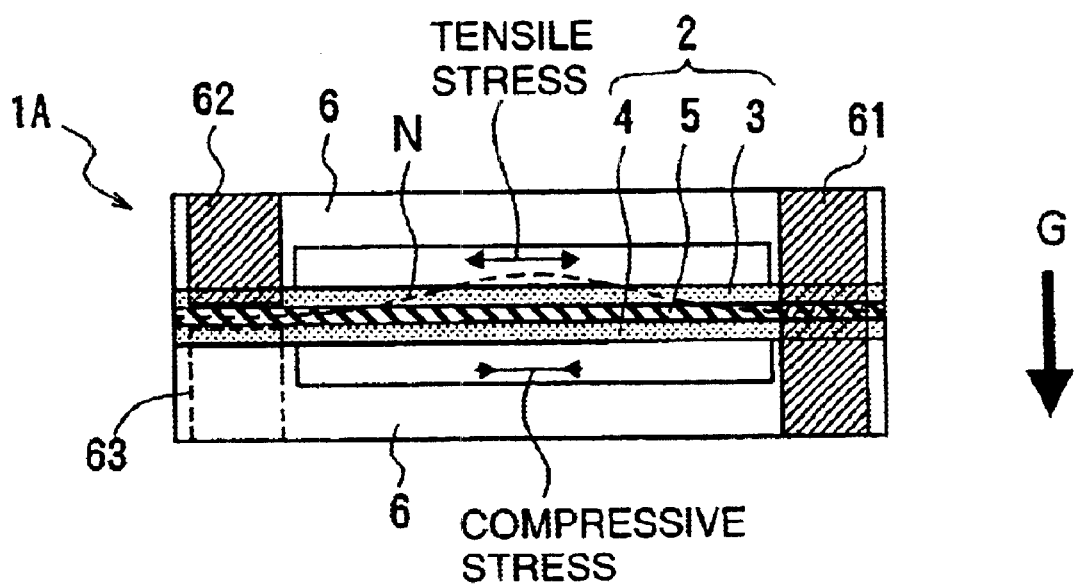
FIG. 5 is a cross-sectional view of the acceleration sensor taken along line V—V in FIG. 4.

When no acceleration G is applied to the acceleration sensor 1A, the two resonators 3 and 4 are oscillated at constant frequencies as independent resonators. If the resonators 3 and 4 have a fully identical structure, the same frequency is oscillated, and the output signal $V_O$ of the counter 8c is zero. When acceleration G is applied to the acceleration sensor 1A, inertia in a direction opposite to the direction of applied acceleration acts on the acceleration detection element 2. The central portion of the acceleration detection element 2 is deflected in the direction opposite to the direction of the applied acceleration. Associated with the deflection of the acceleration detection element 2, tensile stress is generated in the one resonator 3 and compressive stress is generated in the other resonator 4 as shown in FIG. 5. In the resonator working on the thickness-shear vibration mode, the tensile resonator 3 drops in oscillation frequency while the compressive resonator 4 rises in oscillation frequency. The frequency difference is output from the electrodes 3a, 3b, 4a and 4b to the external electrodes 71, 72, and 73 through the internal electrode bands 61, 62, and 63. The signal $V_O$ proportional to the acceleration G is thus obtained.

Not only the magnitude of the acceleration G but also the direction of the acceleration G are detected from the signal $V_O$.

When the acceleration sensor 1A is used in a temperature varying environment, the resonators 3 and 4, the casing members 6, and the covering members 7 thermally expand. When the thermal expansion coefficient of the resonators 3 and 4 is different from that of the casing members 6 and the covering members 7, stresses are generated in the resonators 3 and 4. A change in the frequency difference takes place due to factors other than acceleration. However, if the resonators 3 and 4 are fabricated of the same material and are identically shaped, generated stresses also become equal. Since the frequency counter 8c provides a difference between the outputs of the resonators 3 and 4, changes taking place in the output signals when the resonators 3 and 4 are equally subject to a temperature change cancel each other out. An acceleration detection device susceptible to acceleration G only is thus provided.

Figure 9:
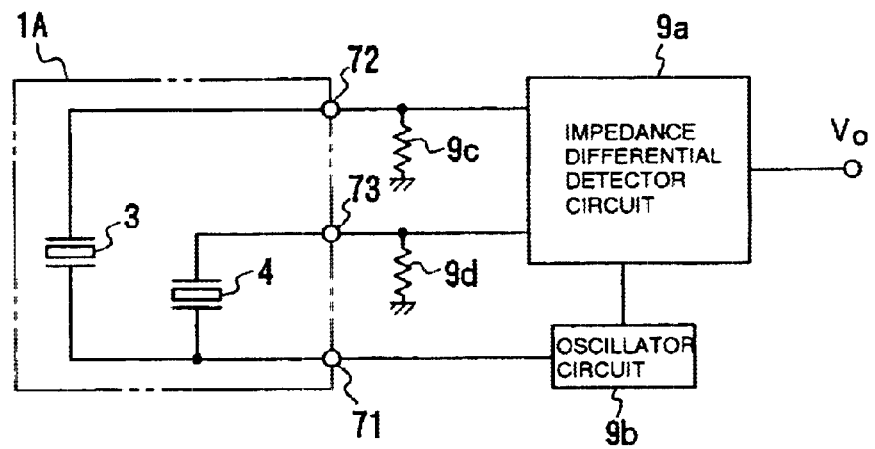
FIG. 9 is a circuit diagram showing another acceleration detection device using the acceleration sensor of the present invention.

FIG. 9 shows another acceleration detection device employing the acceleration sensor 1A. The acceleration detection device uses the same frequency vibrations of the acceleration detection element 2. The external electrodes 72 and 73 of the acceleration sensor 1A are connected to an impedance differential detector circuit 9a. The external electrode 71 as a common electrode is connected to an oscillator circuit 9b. Also included in the device are matching resistors 9c and 9d. The two resonators 3 and 4 are oscillated at the same frequency by the oscillator circuit 9b. A phase difference or an amplitude difference is detected from a difference between electric impedances of the resonators 3 and 4, and an output $V_O$ proportional to acceleration G is obtained from the impedance differential detector circuit 9a. To cause the two resonators 3 and 4 to resonate at the same frequency, the oscillator circuit 9a is arranged so that one of the outputs of the two resonators or the sum of the outputs of the two resonators are fed back.

In this example, again, the signal proportional to acceleration G is picked up, while changes in the outputs due to a temperature change cancel each other out. An acceleration detection device sensitive to the acceleration G only is thus provided.

The acceleration sensor 1A of the first embodiment is employed in the acceleration detection devices shown in FIG. 8 and FIG. 9, and each of the acceleration sensors 1B shown in FIG. 7 may be equally used.

Each of the acceleration sensors 1A, and 1B is structured so that the detection element is securely supported at both ends thereof by the casing member. Alternatively, the detection element may be supported at one end only, i.e., may have a cantilever structure. In this case, displacement of the detection element at the free end thereof is large under acceleration, and a large frequency change or a large impedance change may be obtained.

The acceleration sensors 1A, and 1B of the first and second embodiments employ a thickness-shear resonator for the resonators 3 and 4. The present invention is not limited to this mode. Other modes (such as a thickness vibration mode, a longitudinal vibration mode, an area flexural vibration mode, etc.) may be used.

In accordance with the present invention, a bimorph type acceleration detection element having the two resonator bonded together with the intermediate layer interposed therebetween is used. When the acceleration detection elements are deformed in response to acceleration, compressive stress is generated in one resonator while tensile stress is generated in the other resonator in an effective way. By differentially picking up the frequency changes of the two resonators or the impedance changes of the two resonators, a signal proportional to acceleration is obtained. A high detection-gain acceleration sensor is thus provided.

Since acceleration is detected using the frequency changes or the impedance changes, acceleration of DC or low-frequency components may be detected.

Since stress resulting from a temperature change is exerted on the two resonators, stresses due to factors other than acceleration cancel each other out by differentially picking up the outputs of the two resonators. An acceleration sensor susceptible to acceleration only is thus provided.

Since the acceleration detection elements have a simple construction and routing the electrodes out is easy, a compact design is implemented. The acceleration detection element is thus structured into a surface-mounting component (a chip component).

What is claimed is:
1. An acceleration sensor comprising:
    a bimorph acceleration detection element including;
    a first resonator;
    a second resonator;
    an intermediate layer; and
    an acceleration detection circuit; wherein
        said first resonator and said second resonator are bonded with said intermediate layer interposed therebetween;
        said first and said second resonators include a piezoelectric body and electrodes arranged on both main surfaces thereof;
        said intermediate layer transfers flexural stress from one of said first and said second resonators to the other of said first and said second resonators and attenuates vibrations transmitted from one of said first and said second resonators to the other of said first and said second resonators;
        said acceleration detection element is supported such that said first and second resonators are deflected in the same direction according to the application of acceleration; and
        the acceleration detection circuits detects a difference between frequency changes of said first resonator and said second resonator or a difference between impedance changes of said first resonator and said second resonator which is caused by deflection of said acceleration detection element.

2. An acceleration sensor according to claim 1, wherein said intermediate layer includes an elastic adhesive layer.

3. An acceleration sensor according to one of claims 1 and 2, wherein said first and said second resonators include a vibration mode element in which energy is trapped in a longitudinal center portion thereof;
    a gap is provided in the longitudinal center of said intermediate layer;
    a region of said gap is larger than a trapped vibration region of said first and second resonators and is smaller than a deflection region of said first and second resonators which deflects according to acceleration.

4. An acceleration sensor according to one of claims 1 and 2, wherein an external surface of said acceleration detection element that is facing in a direction of deflection of the bimorph acceleration detection element is covered with a casing member;
    each open surface which said acceleration detection element and said casing member define is covered with a covering member; and
    the electrodes arranged on said first and said second resonators are respectively connected to external electrodes arranged on a surface of said covering member via internal electrodes arranged on a surface of the casing member.

5. An acceleration sensor according to one of claims 1 and 2, wherein said first and second resonators are oscillated at different frequencies;
    a difference between the oscillated frequencies is detected; and
    a signal proportional to acceleration is determined from the frequency difference.

6. An acceleration sensor according to one of claims 1 and 2, wherein said first and second resonators are oscillated at the same frequency;
    one of a phase difference and an amplitude difference is obtained from a difference between electric impedances of said two resonators; and
    a signal proportional to acceleration is determined from one of the phase difference and the amplitude difference.

* * * * *